United States Patent [19]

Miyazaki et al.

[11] Patent Number: 4,576,977
[45] Date of Patent: Mar. 18, 1986

[54] CURABLE RESIN COMPOSITION

[75] Inventors: Nobuyuki Miyazaki; Takashi Takayanagi, both of Yokohama, Japan; Hiromichi Higaki, Irvington, N.Y.

[73] Assignee: Asahi Glass Company Ltd., Tokyo, Japan

[21] Appl. No.: 637,833

[22] Filed: Aug. 6, 1984

[30] Foreign Application Priority Data

Aug. 9, 1983 [JP] Japan ................. 58-144358

[51] Int. Cl.$^4$ ............................... G21F 1/10
[52] U.S. Cl. .................. 523/137; 524/359; 524/462
[58] Field of Search .............. 523/137; 524/359, 462

[56] References Cited

U.S. PATENT DOCUMENTS

| 3,387,035 | 6/1968 | Gray et al. ............ 524/359 |
| 3,407,156 | 10/1968 | Berge ................. 524/336 |
| 3,622,651 | 11/1971 | Vasta ................. 525/163 |
| 3,823,205 | 7/1974 | Zimmt ................ 525/228 |
| 3,945,833 | 3/1976 | Sumita et al. ......... 524/359 |
| 4,104,432 | 8/1978 | Manabe et al. ........ 428/461 |
| 4,208,465 | 6/1980 | Chang ................ 428/458 |
| 4,299,746 | 11/1981 | Frye ................. 428/447 |
| 4,436,851 | 3/1984 | Vaughn, Jr. ........... 524/43 |

FOREIGN PATENT DOCUMENTS

| 0034722 | 2/1981 | European Pat. Off. . |
| 8202397 | 7/1982 | European Pat. Off. ...... 524/359 |
| 52-40551 | 3/1977 | Japan ................. 524/359 |
| 810570 | 3/1959 | United Kingdom . |
| 1186818 | 4/1970 | United Kingdom . |
| 1245639 | 9/1971 | United Kingdom . |

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

A curable resin composition comprising a cured matrix-forming component and an ultraviolet absorber, characterized in that said ultraviolet absorber comprises a benzophenone derivative represented by the formula:

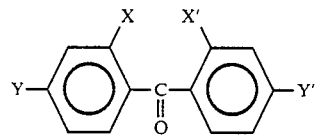

where each of X and X' is a hydrogen atom or a hydroxyl group, provided that at least one of X and X' is a hydroxyl group, each of Y and Y' is a hydrogen, a hydroxyl group, —OROH or —OR', provided that at least one of Y and Y' is —OROH, where R is an alkylene group and R' is a monovalent organic group, and said cured matrix-forming component is reactive with a hydroxyl group.

14 Claims, No Drawings

CURABLE RESIN COMPOSITION

The present invention relates to a curable resin composition, and more particularly, it is concerned with a curable resin composition containing a specific ultraviolet absorber and having improved weatherability and ultraviolet screening property.

It is a common technique in the field of synthetic resin molding products to improve the weatherability or to impart an ultraviolet screening property by an addition of an ultraviolet absorber (hereinafter referred to simply as "UVA"). Such a technique is widely applied to e.g. transparent sheets or ultraviolet screening films.

However, in the conventional resin compositions, the addition of an UVA was usually limited to a level of up to 3 parts by weight relative to 100 parts by weight of the resin. Accordingly, the effects for the improvement of the weatherability or the ultraviolet screening property used to be poor especially for a thin film, although they may have been adequate for a thick molded product.

According to the study of the present inventors, an addition of a substantial amount of an UVA is required to impart an adequate ultraviolet screening property to a thin resin as in the case of a coating composition. On the other hand, if a substantial amount of a usual UVA is added, the mechanical properties of the cured matrix resin tend to be impaired, or it is likely that a so-called breeding out phenomenon appears wherein the UVA breeds out from the matrix resin as the time passes. Consequently, not only the ultraviolet screening property decreases with time, but also there will be various troubles such that the transparency or the outer appearance is likely to be impaired, the surface tends to be easily stained, or the UVA breeded out is likely to stain the clothes.

The present inventors have conducted extensive researches in view of the above problems, and have found that for the solution of the problems, it is effective to use an UVA reactive with a cured matrix-forming component and to conduct the fixing of the UVA in the matrix resin at the same time as the curing of the matrix resin, and that an extremely good result is obtainable when a certain specific benzophenone derivative containing a hydroxyalkoxy group is used as the UVA in combination with a cured matrix-forming component reactive with a hydroxyl group. Thus, present invention has been accomplished on the basis of these discoveries.

The present invention provides a curable resin composition comprising a cured matrix-forming component and an ultraviolet absorber, characterized in that said ultraviolet absorber comprises a benzophenone derivative represented by the formula:

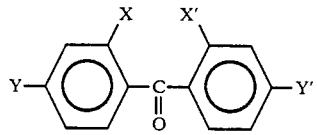
(I)

where each of X and X' is a hydrogen atom or a hydroxyl group, provided that at least one of X and X' is a hydroxyl group, each of Y and Y' is a hydrogen, a hydroxyl group, —OROH or —OR', provided that at least one of Y and Y' is —OROH, where R is an alkylene group and R' is a monovalent organic group, and said cured martix-forming component is reactive with a hydroxyl group.

Now, the present invention will be described with reference to the preferred embodiments.

In the present invention, it is important to use an UVA composed essentially of a benzophenone derivative of the formula I wherein at least one of X and X' is a hydroxyl group and at least one of Y and Y' is a hydroxyalkoxy group.

In the benzophenone derivative of the formula I, the monovalent organic group as R' is preferably an alkyl group or an aralkyl group.

The compound of the formula I may be prepared by various processes depending upon the types of X, X', Y and Y'. For instance, in the case of a 2-hydroxy-4-hydroxyalkoxy-benzophenone where X=OH, Y=—OROH and X'=Y'=H, it is possible to employ a method wherein 2,4-dihydroxybenzophenone is condensed with an alkylene halohydrin represented by the formula XROH where X is a halogen atom and R is as defined above, such as ethylene chlorohydrin or butylene bromohydrin, as a common method. Likewise, it is possible to use preferably a method wherein a similar starting material is reacted with a 1,2-epoxide represented by the formula

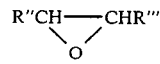

where each of R" and R'" is a hydrogen atom or an alkyl group, such as ethylene oxide, propylene oxide or butylene oxide, for ring opening addition reaction. Further, similar derivatives having other combinations of X, X', Y and Y' can be prepared in a manner similar to the above methods.

As such benzophenone derivatives, it is preferred to employ those wherein R has from 1 to 12 carbon atoms, preferably from 2 to 6 carbon atoms, in view of the ready availability, the ultraviolet screening effect per unit amount and the compatibility with the matrix resin. Here, R is not restricted to a straight chained group, and may be a branched group.

In the present invention, the amount of the UVA is not particularly restricted. It may be used in a small amount at a level of from 0.1 to 3 parts by weight per 100 parts by weight of the resin, as is common in the case of the conventional UVA. However, it is preferred to use it in a large amount at a level of from 5 to 50 parts by weight, since the superiority in the effectivness will be thereby remarkable.

In the present invention, it is important that the cured matrix-forming component is reactive with a hydroxyl group, with a view to fixing the UVA in the matrix resin. As such a cured matrix-forming component, various kinds of materials may be employed without any particular restrictions so long as they are capable of reacting with a hydroxyl group. For instance, there may be mentioned cured matrix-forming components having a functional group such as an isocyanate, a blocked isocyanate, an alkyl ether methylolmelamine, an alkoxysilane, an epoxy resin, an acid anhydride or a metal chelate. More specifically, as the components having an isocyanate and a blocked isocyanate, there may be mentioned various one-pack type or two-pack type urethane resins composed of acryl polyols or polyesters having polyvalent hydroxyl groups and an isocyanate. As the components containing an alkyl ether methylolmelamine, there may be mentioned various amino resins such as an acryl melamine resin, a melamine alkyd resin, a urea resin or a benzoguanamine resin. Further, as components having other functional groups, there may be mentioned an epoxy resin, a silicone resin or a phenol resin. These cured matrix-forming components may be used alone or in combination as a mixture.

In view of the variety of curing methods available, such a cured matrix-forming component is preferably composed essentially of a curing site-containing synthetic resin and a curing agent. Particularly preferred is the one wherein the curing site of the synthetic resin is a hydroxyl group common to the UVA. On the other hand, from the aspect of the properties, it is preferred to employ a fluoropolymer, polyorganosiloxane or acrylic resin having superior weatherability. Particularly preferred is a fluorine-containing resin.

As the fluorine-containing cured matrix-forming component particularly useful for the present invention, there may be mentioned a combination of a fluoropolymer having a hydroxyl group as the curing site with a curing agent reactive with a hydroxyl group.

Here, as the hydroxyl group-containing fluoropolymer, there may be mentioned a copolymer containing a fluoroolefin unit and a hydroxyl group-containing comonomer unit as essential components, a hydrolyzate of a copolymer containing a fluoroolefin unit and a vinyl ester unit as essential components, or a hydrolyzate of a copolymer containing a fluoroolefin unit and an epoxy group-containing comonomer unit as essential components. More specifically, it is possible to advantageously use a polymer containing from 40 to 60 mol % of a fluoroolefin unit, from 5 to 45 mol % of a cyclohexyl vinyl ether unit, from 5 to 45 mol % of an alkyl vinyl ether unit and from 3 to 15 mol % of a hydroxy alkyl vinyl ether unit as essential constituting components (Japanese Unexamined Patent Publication No. 108189/1982); a polymer containing from 10 to 80 mol % of a perfluoroolefin unit, from 5 to 80 mol % of an α-olefin unit and from 3 to 45 mol % of a hydroxy alkyl vinyl ether unit as the essential constituting components; a hydrolyzate of a polymer containing from 20 to 80 mol % of a perhaloolefin unit, from 5 to 80 mol % of an α-olefin unit, and from 3 to 45 mol % of a vinyl ester unit as the essential constituting components; a hydrolyzate of a polymer containing from 20 to 80 mol % of a perhaloolefin unit, from 5 to 80 mol % of a vinlidene fluoride unit and from 3 to 45 mol % of a vinyl ester unit as the essential constituting components; or a hydrolyzate of a polymer containing from 40 to 60 mol % of a fluoroolefin unit, from 5 to 45 mol % of a cyclohexyl vinyl ether unit and from 3 to 45 mol % of a glycidyl vinyl ether unit as the essential constituting components (Japanese Unexamined Patent Publication No. 34108/1982).

As the curing agent reactive with a hydroxyl group, there may be mentioned an isocyanate, a blocked isocyanate, a melamine or a polybasic acid anhydride. More specifically, as the isocyanate, it is possible to use a common polyisoyanate such as tolylene diisocyanate or 4,4'-diphenylmethane diisocyanate, but particularly useful are non-yellowing diisocyanates such as hexamethylene diisocyanate or isophorone diisocyanate, and their adducts. In the case where the isocyanate is used as the curing agent, it is possible to facilitate the curing by the addition of a conventional catalyst such as dibutyl tin dilaurate. As the blocked isoyanate, there may be mentioned those obtained by blocking the above-mentioned isocyanates with phenols, caprolactams or ketone oximes. As the melamine, there may be mentioned butyl ether methylolmelamine or methyl ether methylolmelamine or an epoxy-modified melamine. Depending upon the particular use, various modification degree from 0 to 6 may be employed, and the self condensation degree may also be optionally selected. As the polybasic acid anhydride, it is possible to use in addition to the aromatic polybasic carboxylic acid anhydrides such as phthalic anhydride and pyromellitic anhydride, aliphatic acid polybasic carboxylic acid anhydrides such as maleic anhydride and succinic anhydride.

In the present invention, as the fluorine-containing cured matrix-forming component, there may further be mentioned a combination of an epoxy group-containing fluoropolymer with a polyamine, or a combination of a carboxyl group-containing fluoropolymer with an isocyanate or a blocked isocyanate.

In the present invention, it is preferred that the above-mentioned cured matrix-forming component and the UVA are dissolved in a common solvent for both components to obtain a solution type composition. As such a solvent, there may be used various solvents depending upon the solubility of the both components. For instance, there may be mentioned an aromatic hydrocarbon such as xylene or toluene; an alcohol such as n-butanol; an ester such as butyl acetate; a ketone such as methyl isobutyl ketone; a glycol ether such as ethyl cellusolve, as well as various commercially available thinners. These may be used in combination as mixtures of various proportions.

For the preparation of the curable resin composition of the present invention, there may be employed various apparatus which may be commonly used for the preparation of coating materials such as a ball mill, a paint shaker, a sand mill, a jet mill, a three rollers or a kneader. In such as case, a pigment, a dispersion stabilizer, a viscosity controlling agent, a leveling agent or a gelation-preventive agent, etc. may be added.

The composition of the present invention does not undergo the breeding out of the UVA from the cured matrix resin even when it has a high UVA content. Thus, it is extremely useful for the production of a thin film for ultraviolet screening, or for the formation of an ultraviolet screening layer as a coating composition.

Now, the present invention will be described in further detail with reference to Examples and Comparative Examples. However, it should be understood that the present invention is by no means restricted to these specific Examples.

The UVAs used in the Examples were prepared in accordance with the following reference Examples 1 to 4.

REFERENCE EXAMPLE 1

Into a solvent mixture comprising 120 g of acetone and 70 g of water, 4.0 g (0.1 mol) of sodium hydroxide was dissolved, and 21.4 g (0.1 mol) of 2,4-dihyroxybenzophenone powder was added to obtain a yellow transparent solution. To this solution, 13.9 g (0.1 mol) of 1-bromo-3-hydroxy propane was dropwise added. The entire solution was maintained under a reflux temperature for 14 hours, and then extracted with methylene chloride. The extraction solution was neutralized with 0.1N hydrochloric acid, and washed with water, and methylene chloride was distilled off, whereupon 19.7 g of a product was obtained. From the infrared absorption spectrum, this product was found to be 2-hydroxy-4-(3-hydroxy propoxy)-benzophenone [the formula I wherein X=—OH, X'=—H, Y=—O(CH$_2$)$_3$OH and Y'=H] this product will be referred to simply as "UVA-I".

REFERENCE EXAMPLE 2

21.4 g (0.1 mol) of 2,4-dihydroxy-benzophenone was dissoved in 25 g of acetone, and 4 g of an aqueous solution containing 50% of sodium hydroxide was added. The mixture was fed into an autoclave having a capacity of 100 ml, and after deaerating under a low temperature, 5.8 g (0.1 mol) of propylene oxide was introduced. The mixture was heated to 115° C. and reacted for 7 hours. The reaction solution was washed with an aqueous sodium hydroxide solution, whereby the starting material 2,4-dihydroxy-benzophenone was extracted in an aqueous layer. The residual solution was extracted with methylene chloride. From the infrared absorption spectrum of the product, the product was found to be the following mixture:

A mixture of a compound of the formula I where X=—OH, X'=—H, Y'=—H and Y=—OCH(CH$_3$)CH$_2$OH, and the same compound except for Y being —OCH$_2$CH(CH$_3$)OH. This mixture will be referred to simply as "UVA-II". The yield was about 90%.

REFERENCE EXAMPLE 3

The operation was conducted in the same manner as in Reference Example 1 except that instead of 1-bromo-3-hydroxypropane, 13.7 g (0.1 mol) of 1-chloro-6-hydroxyhexane was used, whereby 4.7 g of a product corresponding to a compound of the formula I where X=—OH, X'=—H, Y=—O(CH$_2$)$_6$OH and Y'=—H was obtained. This product will be referred to simply as "UVA-III".

REFERENCE EXAMPLE 4

In the same manner as in Reference Example 2, 24.6 g (0.1 mol) of 2,2,4,4'-tetrahydroxy-benzophenone and 11.6 g (0.2 mol) of propylene oxide were reacted.

The reaction solution was treated repeatedly in the same manner as in Reference Example 2, whereby 20 g of a product was obtained. From the infrared absorption spectrum, this product was found to be composed mainly of 2,2'- hydroxy-4,4'-di(hydroxypropoxy)benzophenone. This product will be referred to simply as "UVA-IV". Also in this case, two type of the hydroxypropoxy groups were observed.

EXAMPLE 1

The following composition was prepared by using a three component copolymer (hereinafter referred to simply as "fluoropolymer A") comprising 50 mol % of chlorotrifluoroethylene, 40 mol % of cyclohexyl vinyl ether and 10 mol % of hydroxybutyl vinyl ether and having an inherent viscosity of 0.39 dl/g as measured in tetrahydrofurane and a glass transition temperature of 45° C.

| | |
|---|---|
| Fluoropolymer A | 100 parts by weight |
| UVA-I | 20 parts by weight |
| Melamine-type curing agent (UVAN 20SE 60, manufactured by Mitsui Toatsu Kogyo K.K.) | 20 parts by weight |
| Solvent | 300 parts by weight |
| [xylene/n-butanol(50/50 by weight) mixture] | |

The solution-type composition thus obtained was applied onto a glass plate and a flat plate of a glass fiber-reinforced resin (hereinafter referred to simply as "FRP") by means of a bar coater, and cured at 180° C. for 30 minutes, whereby coating films having a thickness of 25 μm were formed, respectively. The coating film formed on the glass plate was peeled off and measured for the ultraviolet absorption characteristics, whereby it was found that the majority of ultraviolet rays having wavelength of at most 370 nm was screened, thus showing a superior ultraviolet absorbing ability. The coated product of the FRP flat plate was subjected to a weathering test by means of a sunshine weatherometer (black panel temperature: 63° C., water spray: 12 minutes every 1 hour), whereby no transfer of the UVA to the surface was observed even after exposure for 1000 hours. Further, 10 g of the coating film was taken and extracted with a n-pentane/n-butanol (50/50 percent by weight) mixture for several hours by means of a Soxhlet extractor, whereby the amount of the extracted UVA was as small as 0.1 g or less.

COMPARATIVE EXAMPLE

A composition having the same composition as in Example 1 was prepared except that instead of UVA-I, 2-hydroxy-4-octoxy-benzophenone as an addition-type UVA was used. The composition was subjected to the same tests as in Example 1. The ultraviolet absorbing ability of the coating film was almost equal to the one obtained in Example 1. However, in the sunshine weatherometer test of the coated product of the FRP flat plate, a yellow powder precipitated on the surface after exposure for 300 hours. From the infrared absorption spectrum, the powder was found to be the UVA transferred to the surface.

EXAMPLE 2

The following composition was prepared.

| | |
|---|---|
| Fluoropolymer A | 100 parts by weight |
| UVA-II | 20 parts by weight |
| Melamine-type curing agent (Cymel 303, manufactured by Mitsui Toatsu Kogyo K.K.) | 15 parts by weight |
| Paratoluene sulfonic acid-containing catalyst (Catalyst #6000, manufactured by Mitsui Toatsu Kogyo K.K.) | 0.5 parts by weight |
| Solvent (Butyl cellsolve acetate) | 200 parts by weight |

The above composition was subjected to the same tests as in Example 1 except that the curing condition was changed to 130° C. for 30 minutes.

In this case, no breeding of the UVA was observed even after exposure for 1000 hours by means of the sunshine weatherometer. The amount of the extracted UVA by means of the Soxhlet's extractor was as small as 1% or less.

EXAMPLE 3

A composition was prepared in the same manner as in Example 2 except that instead of UVA-II, UVA-IV was used. The composition was subjected to the same tests, whereby similar results were obtained.

EXAMPLE 4

The following composition was prepared by using a four component copolymer (hereinafter referred to simply as "fluoropolymer B") comprising 50 mol % of tetrafluoroethylene, 30 mol % of cyclohexyl vinyl ether, 10 mol % of ethyl vinyl ether and 10 mol % of hydroxy butyl vinyl ether and having an inherent viscosity of 0.45 dl/g as measured in hydrofuran at 30° C. and a glass transition temperature of 27° C.

| | |
|---|---|
| Fluoropolymer B | 100 parts by weight |
| UVA-III | 20 parts by weight |
| Silanol group-containing silicone-type curing agent (KR 212, manufactured by Shinetus Chemical Co. Ltd.) | 10 parts by weight |
| Tetrabutyltitanate type catalyst (TBT, manufactured by Nippon Soda Co., Ltd.) | 1 part by weight |
| Solvent (same as Example 1) | 200 parts by weight |

The above composition was subjected to the same tests as in Example 1 except that the curing condition was changed to 210° C. for 10 minutes, whereby similar results were obtained.

EXAMPLES 5 to 7

Various compositions as identified in Table 1 were prepared by using 20 parts of UVA-I in each case and changing the cured matrix-forming component.

TABLE 1

| Examples | 5 | 6 | 7 |
|---|---|---|---|
| Curable resin | Acryl resin (a) 100 | Alkyd resin (b) 100 | Epoxy resin (c) 100 |
| Curing agent | Isocyanate-type (d) 20 | Same as in Example 2 30 | Triethylene tetramine 10 |
| Catalyst | None | Same as in Example 2 0.5 | None |
| Solvent | Xylene/methyl iso-butyl ketone (50/50 by weight) | Same as in Example 1 150 | None |
| Curing condition | 20° C. × 3 days | 130° C. × 30 min. | 20° C. × 3 days |

(a): OH value: 50 mg/KOH/g;
(b): OH value: 70 mgKOH/g
(c): Epikote #828, manufactured by Shell Chemical Co. Ltd.
(d): Coronate EH, manufactured by Nippon Polyurethane K.K.

The above compositions were subjected to the same tests as in Example 1, whereby the same results as obtained in Example 1 were obtained in each case.

We claim:

1. A curable resin composition comprising a cured matrix-forming component and an ultraviolet absorber, wherein said ultraviolet absorber comprises a benzophenone derivative represented by the formula (I):

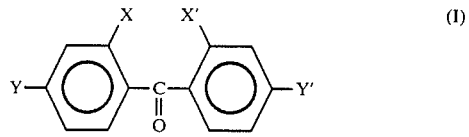

where each of X and X' is a hydrogen atom or a hydroxyl group, provided that at least one of X and X' is a hydroxyl group, each of Y and Y' is a hydrogen, a hydroxyl group, —OROH or —OR', provided that at least one of Y and Y' is —OROH, where R is an alkylene group and R' is a monovalent organic group, and said cured matrix forming component is reactive with a hydroxyl group.

2. The curable resin composition according to claim 1, wherein the monovalent organic group is an alkyl group or an aralkyl group.

3. The curable resin composition according to claim 1, wherein the cured matrix-forming component is composed essentially of a cure site-containing synthetic resin and a curing agent.

4. The curable resin composition according to claim 3, wherein the amount of the ultraviolet absorber is from 5 to 50 parts by weight, relative to 100 parts by weight of the cure site-containing synthetic resin.

5. The curable resin composition according to claim 3, wherein the cure site-containing synthetic resin is a hydroxyl group-containing polymer.

6. The curable resin composition according to claim 5, wherein the hydroxyl group-containing polymer is a hydroxyl group-containing fluoropolymer.

7. The curable resin composition according to claim 1, wherein said alkylene group, R, has 1 to 12 carbon atoms.

8. The curable resin composition according to claim 7, wherein said alkylene group, R, has 2 to 6 carbon atoms.

9. The curable resin composition according to claim 1, wherein said ultraviolet absorber is 2-hydroxy-4-(3-hydroxypropoxy)-benzophenone.

10. The curable resin composition according to claim 1, wherein said utlraviolet absorber is a mixture of 2-hydroxy-4-(3-hydroxyisopropoxy)-benzophenone and 2-hydroxy-4-(2-hydroxypropoxy)-benzophenone.

11. The curable resin composition according to claim 1, wherein said ultraviolet absorber is 2-hydroxy-4-(6-hydroxyhexoxy)-benzophenone.

12. The curable resin composition according to claim 1, wherein said ultraviolet absorber is 2,2'-hydroxy-4,4'-di-(hydroxypropoxy)-benzophenone.

13. The curable resin composition according to claim 1, wherein said cured matrix-forming component comprises 50 mole percent of chlorotrifluoroethylene, 40 mole % of cyclohexyl vinyl ether and 10 mole % of hydroxybutyl vinyl ether.

14. The curable resin composition according to claim 1, wherein said cured matrix-forming component comprises 50 mole % of tetrafluoroethylene, 30 mole % of cyclohexyl vinyl ether, 10 mole % of ethyl vinyl ether and 10 mole percent of hydroxybutyl vinyl ether.

* * * * *